United States Patent [19]
Zdenek et al.

[11] Patent Number: 6,160,807
[45] Date of Patent: Dec. 12, 2000

[54] TIMESLOT INTERCHANGE NETWORK

[75] Inventors: Jerrold Scott Zdenek, Riverside; Barry W. Jones, Hoffman Estates, both of Ill.

[73] Assignee: Rockwell International, Milwaukee, Wis.

[21] Appl. No.: 08/990,833

[22] Filed: Dec. 15, 1997

[51] Int. Cl.[7] .................................................. H04Q 11/00
[52] U.S. Cl. ........................................................... 370/376
[58] Field of Search .................................... 370/375, 376, 370/377, 378, 379

[56] References Cited

U.S. PATENT DOCUMENTS

| | | | |
|---|---|---|---|
| 4,545,053 | 10/1985 | Raamot ................................... | 370/376 |
| 4,546,468 | 10/1985 | Chrismas et al. ....................... | 370/376 |
| 4,937,820 | 6/1990 | Kawula .................................... | 370/528 |
| 5,331,632 | 7/1994 | Aaron et al. ............................ | 370/376 |
| 5,905,735 | 5/1999 | Wille ....................................... | 370/376 |
| 5,953,330 | 9/1999 | Canniff et al. .......................... | 370/375 |
| 6,002,685 | 12/1999 | Wille et al. .............................. | 370/376 |

*Primary Examiner*—Chi H. Pham
*Assistant Examiner*—Maikhanh Tran
*Attorney, Agent, or Firm*—Welsh & Katz, Ltd.

[57] ABSTRACT

A time slot interchange having a data channel memory, a channel circuit, having a write address output, the write address output connected to the data channel memory, a signal processing circuit, having a channel input coupled to the data channel memory, a gain input, and an output coupled to the time division multiplexed signal output port, and a connection memory, including a unique read channel field comprising a read address portion and a gain value portion for each data channel to be output by the time slot interchange network. The connection memory has an input connected to the write address output of the channel circuit, a read address output connected to the data channel memory, and a gain value output connected to the gain input of the signal processing circuit.

22 Claims, 3 Drawing Sheets

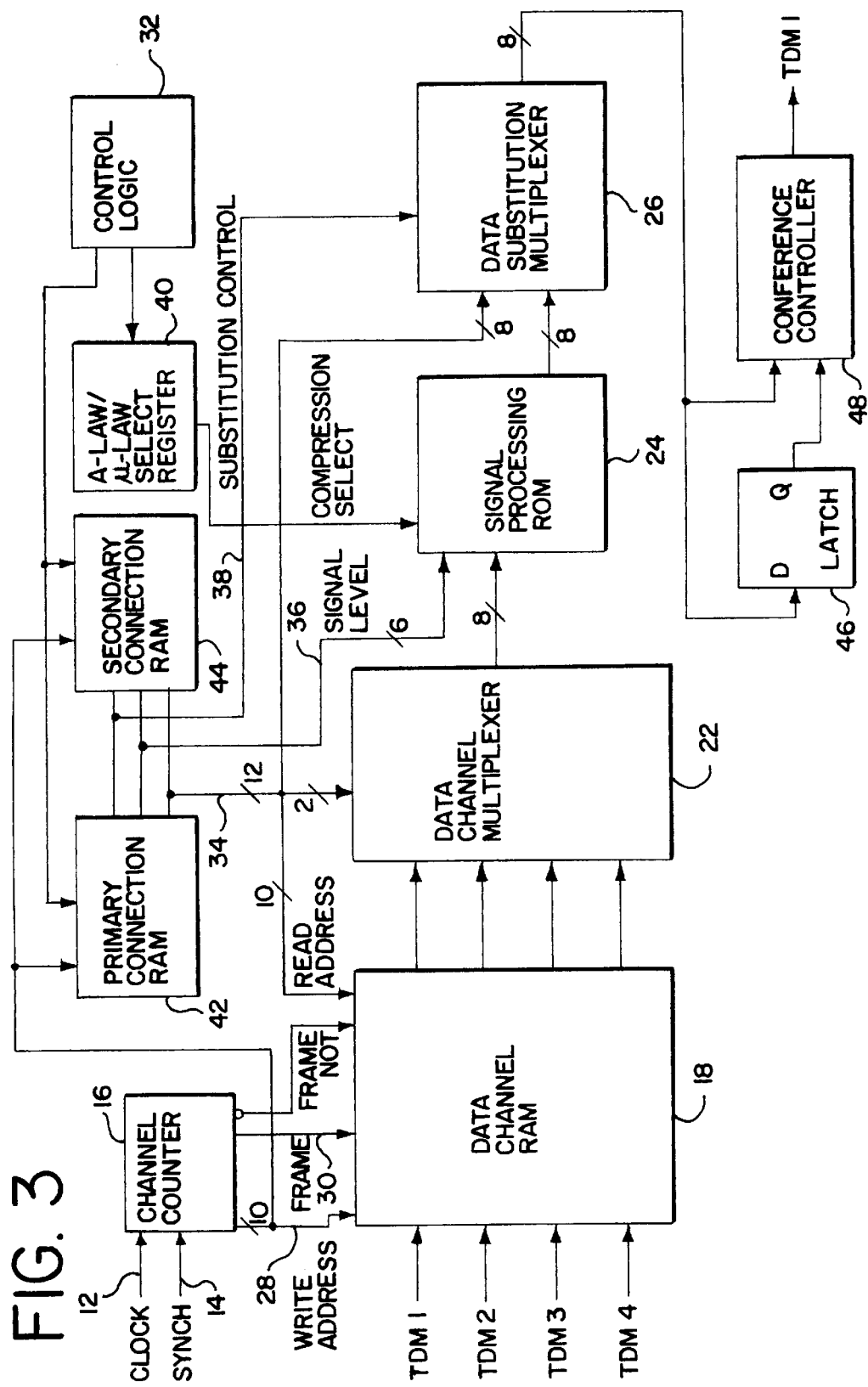

TIMESLOT INTERCHANGE NETWORK

BACKGROUND

This invention relates generally to a time slot interchange network ("TSI network") and more particularly to a novel highly functional TSI network implemented with relatively few control components.

Telephone networks often multiplex numerous data channels onto a given data transmission medium. A "data channel" may represent an individual voice channel associated with a given telephone subscriber. A "data channel" may also represent a dedicated computer modem channel, a telephone network maintenance channel, or a previously multiplexed series of channels. "Data transmission medium" is not intended to be limited to any particular transmission medium, and includes, for example, wire transmission lines, radio frequency bandwidth, and lightwave transmission guides, such as fiber optic lines.

One known method of multiplexing channels of data is time division multiplexing.

Time division multiplexing assigns sequential time slots to a given data transmission medium. In this way, a given transmission medium may be divided into many discrete data channels. A composite signal of these time division multiplexed channels is referred to herein as a TDM signal.

TSI networks are typically used to manipulate data channels in a TDM signal. For example, a TSI network may be used to interchange channels between time slots within a given TDM signal. A TSI network may also be used to interchange channels between time slots in additional TDM signals. In this manner, transmission media may be groomed to achieve optimum capacity for a given TDM signal or route data channels to desired TDM signals.

Because a TSI network typically has access to individual data channels, it may become advantageous to perform signal processing in addition to merely re-sequencing data channels into different time slots. For example, it may be desirable to amplify or attenuate the signal level of a given voice channel. Additionally, it may be desirable to combine data channels. It may also be desirable to originate data channels with predetermined data.

This invention provides a novel and simple way to structure and implement a TSI network for a relatively large number of ports with minimal components. One embodiment of TSI network of the present invention allows the specification of time slot connections, amplification and attenuation values to apply to that connected data. In another embodiment, a constant pulse code modulation ("PCM") pattern to be delivered to an outgoing channel is specified. In another embodiment, all of the parameters are specified in a single microprocessor write cycle.

A time slot interchange is therefore provided having a time division multiplexed signal input port and time division multiplexed signal output port for interchanging time division multiplexed data channels. The time slot interchange comprises a data channel memory, coupled to the time division multiplexed signal input port, a channel circuit, having a write address output, the write address output connected to the data channel memory, a signal processing circuit, having a channel input coupled to the data channel memory, a gain input, and an output coupled to the time division multiplexed signal output port, and a connection memory, including a unique read channel field comprising a read address portion and a gain value portion for each data channel to be output by the time slot interchange network, the connection memory having an input connected to the write address output of the channel circuit, a read address output connected to the data channel memory, and a gain value output connected to the gain input of the signal processing circuit.

BRIEF DESCRIPTION OF THE DRAWING

The invention, together with further objects and advantage thereof, may be understood by reference to the following description taken in conjunction with the accompanying drawings.

FIG. 3 shows a block diagram of one node of another embodiment of the present invention.

DETAILED DESCRIPTION

The TSI network of the present invention is described with reference to four 772 channel TDM signals, comprising a total of 3088 channels. However, various TDM signals are known to have various channel capacities, and various numbers of TDM signals may be processed by a TSI network. Therefore it is emphasized that TSI networks may be configured having various capacities, and the present invention is not intended to be limited to the particular illustrated configuration. Also, a given TDM signal may be a composite of more than one lower-rate TDM signals. For example, a TDM input port may comprise one or more TDM signals on one or more transmission media. Accordingly, as used herein, unless clearly indicated to the contrary, reference to an item in the singular (such as with the indefinite article "a") refers to one or more of the referenced items.

Figure 1:
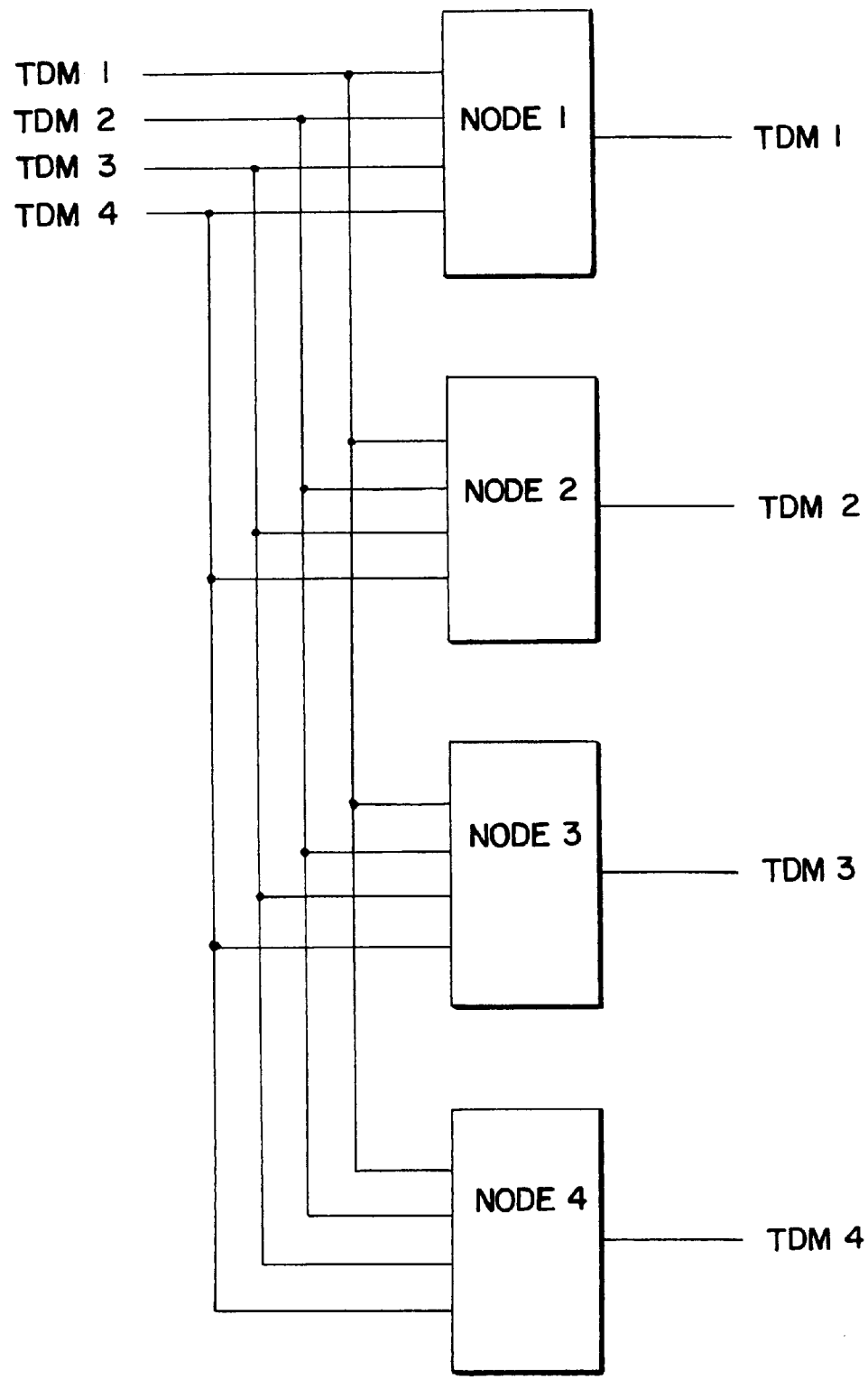
FIG. 1 shows a block diagram of one node of an exemplary embodiment of the present invention.
Figure 2:
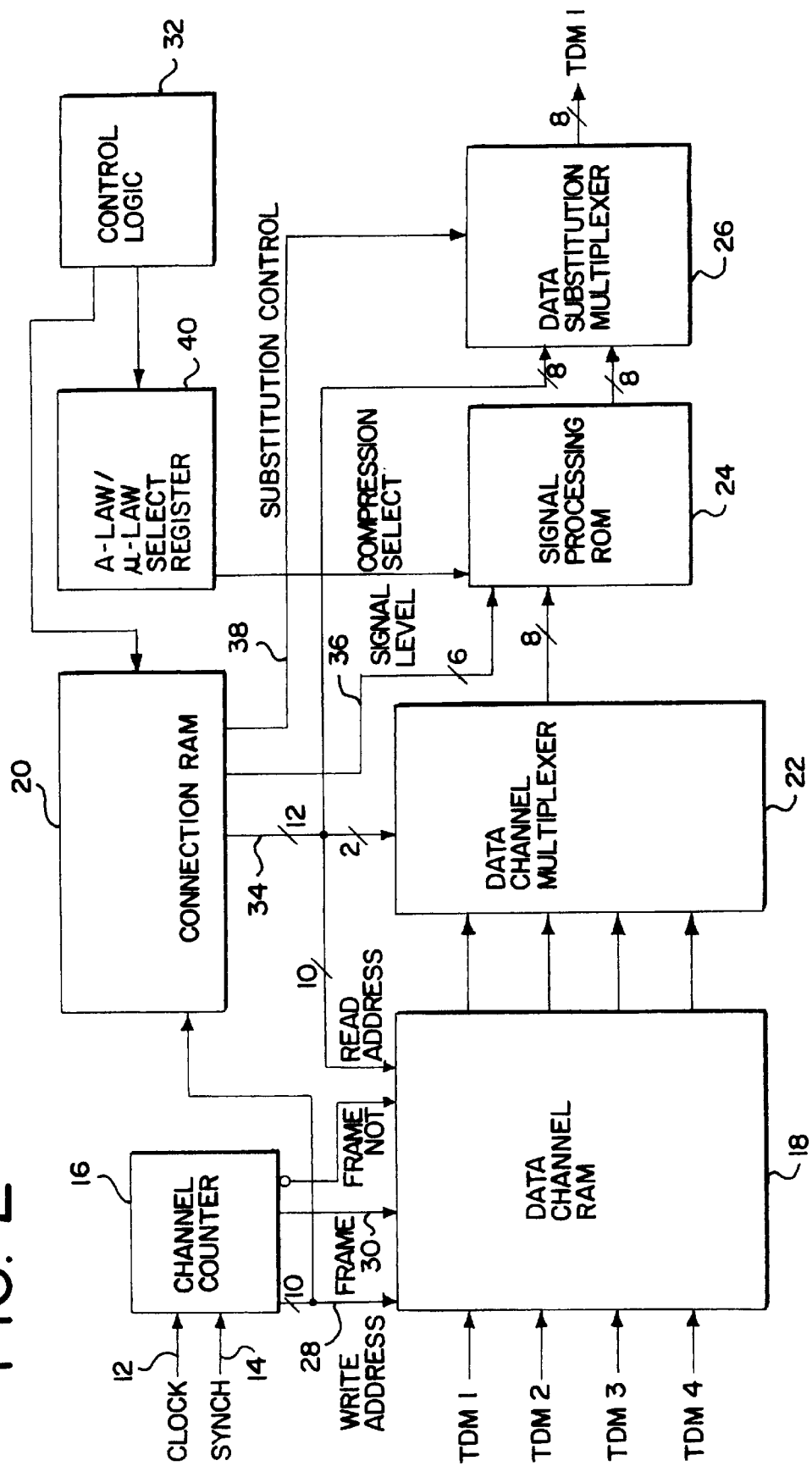
FIG. 2 shows a block diagram of one node of another embodiment of the present invention.

The illustrated embodiment is divided into a number of switching nodes, each node corresponding to an associated TDM signal. The TDM signals are arbitrarily designated TDM1, TDM2, TDM3, and TDM4. Each of the nodes is assigned an arbitrary node designation. In the embodiment illustrated in FIGS. 1–3, there are four nodes, designated Node 1, Node 2, Node 3, and Node 4. FIG. 1 illustrates the connections of the TDM signals to the various nodes in a four node system. FIGS. 2 and 3 illustrate two embodiments the TSI network configuration for Node 1. In a given embodiment, the remaining nodes are typically substantively identical to Node 1. Accordingly, Nodes 2–4 are not independently illustrated.

Each node, in the illustrated four-node system, receives data from four input TDM signals and transmits data for one output TDM signal. For example, Node 1 receives data from inbound TDM1, TDM2, TDM3, and TDM4, and outputs data to outbound TDM1. Continuing the example, Node 2 also receives data from inbound TDM1, TDM2, TDM3, and TDM4, and outputs data to outbound TDM2. Nodes 3 and 4 are configured correspondingly with outputs to TDM3 and TDM4, respectively.

Typically, each node receives data from any given TDM signal on the same input connection as the other nodes. This is done to facilitate the unique identification of each channel of each TDM signal. In the illustrated embodiment, for example, the 3308 channels input to each node are designated 0–3307. TDM1 is connected to the input corresponding to channels 0 through 771 on all four nodes. Similarly, TDM2 is connected to the input corresponding to channels 772 through 1543 on all four nodes. The designation of time slot numbers continues in this fashion for all nodes in the system. In this way, any given channel in a node always corresponds to the same channel in the other nodes. Alternative connection schemes are possible, but some may pose increased complexity when determining connection paths through the TSI network.

Referring to FIG. 2, the illustrated embodiment receives a distributed clock 12 having a base clock frequency of 6.176 MHz, or a multiple of 6.176 MHz, in a channel counter 16. The base clock frequency of 6.176 MHz corresponds to a rate of arrival of data channels in the TDM signal. Different TDM signals may have different data rates, and therefore, different base clock frequencies. Distributing a multiple of the base clock frequency provides granularity in time for storing and manipulating data channels by allowing additional processor clock cycles for each data channel. The channel counter 16 also receives a distributed 8 kHz synchronization signal 14 which defines the first channel of each TDM signal. Synchronizing each node to the same distributed clock 12 and synchronization signal 14 causes all nodes to operate synchronously with one another.

The example node illustrated in FIG. 2 includes the channel counter 16, a dual-port data channel RAM 18, a connection RAM 20, a data channel multiplexer 22, a signal processing ROM 24, and a data substitution multiplexer 26. The channel counter 16 typically includes a conventional counter (not shown). The counter is driven by the distributed clock 12 and synchronized to the synchronization signal 14. The counter's output may be used directly as a write address bus 28 for the dual-port RAM, or additional decoding may be performed. The counter also generates a frame signal 30.

In the illustrated embodiment, the channel counter 16 output comprises the write address bus 28 connected to an address input of a first port of the data channel RAM 18. Each TDM signal is coupled to the data inputs of the first port of the data channel RAM 18. The TDM signals may be coupled through buffers, or re-timed in latches or flip-flops (not shown). In the illustrated embodiment, the address bus increments from a value of zero (at the 8 kHz synchronization signal) to 771 for each cycle of the 6.176 MHz base clock. Thus, each channel of each TDM signal is written into a distinct memory location in the data channel RAM 18. Additionally, in the illustrated embodiment, the frame signal is also connected to the first port of the data channel RAM 18, and the data channel RAM 18 is selected to have the capacity to store two complete frames of 3088 channels. Typically, one frame is written to the first set of the data channel RAM 18 at any given time, with the other frame available for access from a second port of the data channel RAM 18.

It should be noted that while the invention is described with respect to particular electrical components, the invention is not so limited. For example, a dual-port RAM is just one type of component that may be used to implement the data channel RAM 18. For example, the frame signal may be used, with additional control circuitry, to alternate reading and writing between banks of single-port RAMs to implement the data channel RAM 18. Additionally, each block illustrated in the drawing may comprise more than one physical component. For example, the data channel RAM 18 may comprise a single 32 bit wide RAM, two 16 bit wide RAMs, or four 8 bit wide RAMs.

In the illustrated embodiment of FIG. 2, data is read from the second port of the data channel RAM 18 to be output on the node's 772 channel TDM signal. The address for reading the data out of the data channel RAM 18 is generated as follows. The channel counter 16 is connected to the connection RAM 20. In the illustrated embodiment, the connection between the channel counter 16 and the connection RAM 20 comprises the write address 28. The connection RAM 20 includes a memory location corresponding to each output channel of the outbound TDM signal. In the illustrated embodiment, the memory location corresponding to each outbound channel comprises a read channel field including a read address designating which input channel is selected as the data for the particular outbound channel, an amplification or attenuation value ("gain value") to apply to that PCM data, and a substitution bit to specify whether a constant PCM value is to be output to that channel in place of a previously input data channel. The dimensions of the connection RAM 20 for the illustrated four node system is 772 fields × 19 bits per field. The 772 length is directly related to the node size of 772 channels—a unique location is reserved for each channel of the local switching node. The width of 19 is provided to hold (a) one bit for the substitution control bit, (b) 12 bits for the read address indicating which of the switch's 3088 channels data should be output to the given channel, and (c) 6 bits for the gain value defining which of 64 distinct values of attenuation or gain to apply to data before output to the given channel. Control logic 32, preferably comprising a microprocessor, programs the connections and signal processing for the TSI network by writing data to the connection RAM 20. Using a 32 bit microprocessor, the 19 bits of data (and more if required by larger size switches) can be written in a single microprocessor access cycle.

In the illustrated embodiment of FIG. 2, at least a portion of read channel field is connected to the data channel RAM 18 via a read address bus 34. In this embodiment, 10 bits of the 12 bit read address (sufficient to select channels 0–771) are connected to the address input of the second port of the data channel RAM 18. Two additional bits are of the 12 bit read address connected to and control the data channel multiplexer 22 for the final selection between the input TDM signals TDM1 through TDM4. It should be noted that while multiplexers are used in the illustrated embodiment, the invention is not necessarily so limited. For example, the selecting between input TDM signals may be implemented by connecting in parallel the outputs of tri-state devices and using address data, appropriately decoded, to enable the output of one tri-state device at a time.

Another portion of the read channel field of this example is the gain value. In the illustrated embodiment, a gain value signal 36 connects the gain value to the signal processing ROM 24. The gain value may represent an amplification or an attenuation of the data read out of the data channel RAM 18 for the current output channel. The amplification or attenuation is performed by the signal processing ROM 24. In this manner, the signal level of the data channel may be adjusted higher or lower. In the illustrated embodiment, the signal processing ROM 24 comprises a look-up table stored in a read only memory ("ROM"). However, circuitry other than ROMs may be used for amplifying or attenuating the signal, such as arithmetic or other logic circuits. In the illustrated embodiment, the data channel from the data channel RAM 18, as selected through the data channel multiplexer 22, is connected to address inputs of the signal processing ROM 24. The 6-bit gain value is applied to additional inputs of the signal processing ROM 24. An additional input for the signal processing ROM 24 may be an A-law/U-law selection signal. Typically, the A-law/U-law selection bit is set by the control logic 32 in a A-law/U-law select register 40 and is the same for all channels. Applying the 8 bit data channel, the 6 bit gain value, and the A-law/ U-law selection bit to the signal processing ROM 24 causes the look-up table of the ROM to output an 8 bit byte.

Another portion of the read channel field in this example comprises the substitution control bit. A substitution control signal connects the connection RAM 20 to the data substitution multiplexer 26. Should the substitution control bit be enabled for a given output channel, eight of the bits of the read channel field, for example, the 8 bits least significant of the read address, are output as the PCM word instead of data from the signal processing ROM 24. Alternatively, substitution of PCM data may be initiated by coding a PCM substitution signal into otherwise unused address space in the address field. See, for example, U.S. Pat. No. 4,937,820, incorporated herein by reference. By employing a substitution control bit as part of the data and allowing the substitution pattern to be specified in the same data field as would otherwise contain a connection address, the data substitution multiplexer 26, for example, a simple 8 bit 2:1 multiplexer, can be employed to have a constant PCM pattern delivered as output to a given channel with no complication to the data ram control circuitry. Note that a benefit from this structure is that a constant data value can be independently specified for any one or all output channels, in lieu of connecting the output channel or channels to an input channel's data.

In the illustrated embodiment, the data received from each of the four TDM signals in the system depicted is stored in parallel as a 32 bit word. The upper 8 bits of the 32 bit word correspond to data channels from TDM4 and the lower 8 bits of the 32 bit word correspond to data from TDM1. As previously discussed, the data channel RAM 18 is selected to provide storage for two complete frames of data from the TDM signals. When the first port is writing to the first frame, the second port is reading from the second frame. Similarly, when the first port is writing to the second frame, the second port is reading from the previously-written first frame. Allowing the first port to write a complete frame into memory before the frame is read by the second port ensures that each channel read from the data channel RAM 18 is from the same 8 kHz synchronization period.

The read address bus 34 for the second port of the data channel RAM 18 is generated by the connection RAM 20 in the example illustrated in FIG. 2. During TSI network set-up, the control logic 32 loads a connection map into the connection RAM 20. This connection map may be modified from time to time. In the illustrated embodiment, the write address bus 28 from the channel counter 16 is connected to address inputs for the data channel RAM 20. The channel counter 16 output increments from 0 to 771, with each increment corresponding to output channel in the associated TDM signal. For each increment, the connection RAM 20 will output a read channel field. In the illustrated embodiment, a 12 bit portion of the read channel field is a read address. The read address designates which input channel, if any, is to be connected to the output channel corresponding to the present state of the time slot counter. In the illustrated embodiment, the lower 10 bits of the read address and the frame signal are connected to the second port of the data channel RAM 18. These 10 bits are sufficient to select between channels 0–771 of the input TDM signals. The upper 2 bits of the read address are connected to the control inputs of the data channel multiplexer 22. The data inputs of the data channel multiplexer 22 are connected to the data outputs of the second port of the data channel RAM 18. The two address bits cause the data channel multiplexer 22 to select the appropriate 8 bit byte of the 32 bit word read from the data channel RAM 18.

In the illustrated embodiment, the output of the signal processing ROM 34 is connected to a first data input of the data substitution multiplexer 26. The lower eight bits of the read address bus 34 are connected to a second data input of the data substitution multiplexer 26. The substitution control 38 is connected to a control input of the data substitution multiplexer 26. The substitution multiplexer 26 selects between the data output by the signal processing ROM 24 and a substitute 8 bit PCM word contained in the real address bus 34. When the substitution bit is clear, the data from the signal processing ROM 34 is selected by the substitution multiplexer 26. When the substitution bit is set, the 8 bits from the read address bus 34 are selected by the substitution multiplexer 26, thereby replacing the selected data channel with a fixed, preselected PCM word.

The example provided in FIG. 2 is an illustration of the concept of this invention. In another embodiment, however, a switch with sixteen 772 channel nodes is devised. In the sixteen node system, the data channel RAM 18 comprises four in parallel 2kX32 dual-port RAMs. In the sixteen node system the data channel multiplexer 22 is an 8 bit sixteen-to-one multiplexer and the read address field of the connection RAM 20 contains 14 bits to uniquely identify which of the 12,352 channels in the system are to be switched to a given channel. Thus, the invention may be scaled in size to accommodate the needs of a given situation.

In another embodiment, illustrated in FIG. 3, each output data channel may be connected as the sum of any other two channels. Summing channels may be used to establish a conference call between telephone subscribers. Channels may be summed as follows. The connection RAM 20 is designated a primary connection RAM 42. A secondary connection RAM 44, typically the same size as the primary connection RAM 42, is also provided. The primary connection RAM 42 and the secondary connection RAM 44 read the same data channel RAM 18 sequentially during the same time slot. Double reading of the data channel RAM 18 avoids the expense and added complexity of providing a second data channel RAM.

In operation, the primary connection RAM 42 of the example illustrated in FIG. 3 generates a primary output channel for the TDM signal as described above. The primary output channel is stored from the output of the substitution multiplexer 26 in a latch 46. The output of this latch is connected to address inputs of a conference controller 48. In the illustrated embodiment, the conference controller 48 comprises a look-up table stored in ROM. The secondary connection RAM 44 generates a secondary output channel, in the same manner as the primary connection RAM 42. The outputs of the substitution multiplexer 26 are connected to additional address inputs of the conference controller 48. The conference controller 48 may also be provided with the A-law/U-law select bit. The conference controller 48 then outputs a value which is the linear sum of the primary output channel and the secondary output channel.

The foregoing description is given for clarity of understanding of the invention. It is to be understood that various changes can be made to the illustrated embodiments described by one skilled in the art without departing from the scope or spirit of the invention and that the invention is not limited to the embodiments described. It is therefore contemplated to cover all modifications, variations, or equivalents that fall within the scope of the appended claims.

What is claimed is:

1. A time slot interchange having a time division multiplexed signal input port and a time division multiplexed signal output port, for interchanging time division multiplexed data channels, comprising:

a data channel memory, coupled to the time division multiplexed signal input port;

a channel circuit, having a write address output, the write address output connected to the data channel memory;

a signal processing circuit, having a channel input coupled to the data channel memory, a gain input, and an output coupled to the time division multiplexed signal output port; and a connection memory, including a unique read channel field comprising a read address portion and a gain value portion for each data channel to be output by the time slot interchange network, the connection memory having an input connected to the write address output of the channel circuit, a read address output connected to the data channel memory, and a gain value output connected to the gain input of the signal processing circuit.

2. The time slot interchange of claim 1, wherein the channel input of the signal processing circuit is coupled to the data channel memory by a data channel multiplexer, the data channel multiplexer having a selection input connected to the connection memory.

3. The time slot interchange of claim 1, wherein the time division multiplexed signal output port is coupled to the output of the signal processing circuit by a data substitution multiplexer, the data substitution multiplexer connected to the read address output of the connection memory and alternatively coupling at least a portion of the read address output of the connection memory and the output of the signal processing circuit to the time division multiplexed signal output port.

4. The time slot interchange of claim 1, wherein the signal processing circuit comprises a tabulation of outputs corresponding to values which may be input on the channel input and the gain input.

5. The time slot interchange of claim 1, wherein the connection memory comprises a first connection memory, the time slot interchange further comprising:

a second connection memory, including a secondary unique read channel field comprising a secondary read address portion and a secondary gain value portion for each data channel to be output by the time slot interchange network, the second connection memory having an input connected to the write address output of the channel circuit, a secondary read address output connected to the data channel memory, and a secondary gain value output connected to the gain input of the signal processing circuit; and wherein the signal processing circuit is coupled to the time division multiplexed signal output port by a data channel summation circuit.

6. The time slot interchange of claim 5, wherein the data channel summation circuit includes a first input, a second input, a tabulation of sums of values which may be input on the first and second inputs, and an output.

7. The time slot interchange of claim 1, wherein the data channel memory comprises a plurality of data channel memories, the channel circuit comprises a plurality of channel circuits, the signal processing circuit comprises a plurality of signal processing circuits, and the connection memory comprises a plurality of connection memories.

8. A time slot interchange, for receiving, interchanging, and outputting at least one time division multiplexed signal having a plurality of time division multiplexed data channels, comprising:

means for storing the time division multiplexed signal;

means for determining a sequence of input data channels, connected to the means for storing;

means for adjusting a signal level of data channels, coupled to the means for storing;

means for determining a sequence of output data channels, connected to the means for storing; and means for determining a signal level of output data channels, connected to the means for adjusting a signal level.

9. The time slot interchange of claim 8, wherein the means for adjusting a signal level is connected to a means for substituting PCM data, and the means for substituting is connected to the means for determining a sequence of output data channels.

10. The time slot interchange of claim 8, wherein the means for determining a sequence of output data channels comprises a first means for determining a sequence of output data channels and the means for determining a signal level of output data channels comprises a first means for determining a signal level of output data channels; the time slot interchange further comprising:

second means for determining a sequence of output data channels, connected to the means for storing;

second means for determining a signal level of output data channels, connected to the means for adjusting a signal level; and wherein the means for adjusting a signal level is coupled to the means for transmitting by means for summing data channels.

11. The time slot interchange of claim 10, wherein the means for adjusting a signal level is coupled to the means for summing data channels by a means for substituting PCM data, the means for substituting connected to the first means for determining a sequence of output data channels.

12. A method for controlling a time slot interchange for receiving, interchanging, and outputting time division multiplexed data channels, comprising the steps of:

receiving time division multiplexed data channels;

storing the time division multiplexed data channels in a predetermined input sequence;

retrieving the time division multiplexed data channels in a predetermined output sequence;

determining a level of amplification or attenuation of the retrieved time division multiplexed data channels;

adjusting a signal level of the time division multiplexed data channels;

transmitting the retrieved and adjusted time division multiplexed data channels.

13. The method of claim 12, further comprising the step of substituting PCM data for predetermined retrieved and adjusted time division multiplexed data channels.

14. The method of claim 12, wherein the retrieved and adjusted time division multiplexed data channels comprise a first set of the retrieved and adjusted time division multiplexed data channels, the method further comprising the steps of:

retrieving a second set of the time division multiplexed data channels in a predetermined output sequence;

determining a level of amplification or attenuation for the second set of the retrieved time division multiplexed data channels;

adjusting a signal level of the second set of the time division multiplexed data channels;

summing the second set of the retrieved and adjusted time division multiplexed data channels with the first set of the retrieved and adjusted time division multiplexed data channels.

15. The method of claim 14, further comprising the step of substituting PCM data for predetermined retrieved and adjusted time division multiplexed data channels.

16. A time slot interchange network for receiving a plurality of input time division multiplexed signals and transmitting a plurality of output time division multiplexed signals, and for interchanging time division multiplexed data channels, comprising: a plurality of time slot interchanges, each time slot interchange having at least one time division multiplexed signal input port; and at least one time division multiplexed signal output port;

a data channel memory, coupled to the at least one time division multiplexed signal input port;

a channel circuit, having a write address output, the write address output connected to the data channel memory;

a signal processing circuit, having a channel input coupled to the data channel memory, a gain input, and an output coupled to the at least one time division multiplexed signal output port; and a connection memory, including a unique read channel field comprising a read address portion and a gain value portion for each data channel to be output by the time slot interchange network, the connection memory having an input connected to the write address output of the channel circuit, a read address output connected to the data channel memory, and a gain value output connected to the gain input of the signal processing circuit;

wherein the time division multiplexed signal input ports of each time slot interchange are connected in parallel.

17. The time slot interchange network of claim 16, wherein the channel input of the signal processing circuit is coupled to the data channel memory by a data channel multiplexer, the data channel multiplexer having a selection input connected to the connection memory.

18. The time slot interchange network of claim 16, wherein the at least one time division multiplexed signal output port is coupled to the output of the signal processing circuit by a data substitution multiplexer, the data substitution multiplexer connected to the read address output of the connection memory and alternatively coupling at least a portion of the read address output of the connection memory and the output of the signal processing circuit to the at least one time division multiplexed signal output port.

19. The time slot interchange network of claim 16, wherein the signal processing circuit comprises a tabulation of outputs corresponding to values which may be input on the channel input and the gain input.

20. The time slot interchange network of claim 16, wherein the connection memory comprises a first connection memory, each time slot interchange further comprising:

a second connection memory, including a secondary unique read channel field comprising a secondary read address portion and a secondary gain value portion for each data channel to be output by the time slot interchange network, the second connection memory having an input connected to the write address output of the channel circuit, a secondary read address output connected to the data channel memory, and a secondary gain value output connected to the gain input of the signal processing circuit; and wherein the signal processing circuit is coupled to the time division multiplexed signal output port by a data channel summation circuit.

21. The time slot interchange network of claim 20, wherein the data channel summation circuit includes a first input, a second input, a tabulation of sums of values which may be input on the first and second inputs, and an output.

22. The time slot interchange network of claim 16, wherein the data channel memory comprises a plurality of data channel memories, the channel circuit comprises a plurality of channel circuits, the signal processing circuit comprises a plurality of signal processing circuits, and the connection memory comprises a plurality of connection memories.

* * * * *